A. WATKINS.
THERMOMETER FOR BAKERS.
APPLICATION FILED DEC. 8, 1914.
1,153,740.
Patented Sept. 14, 1915.
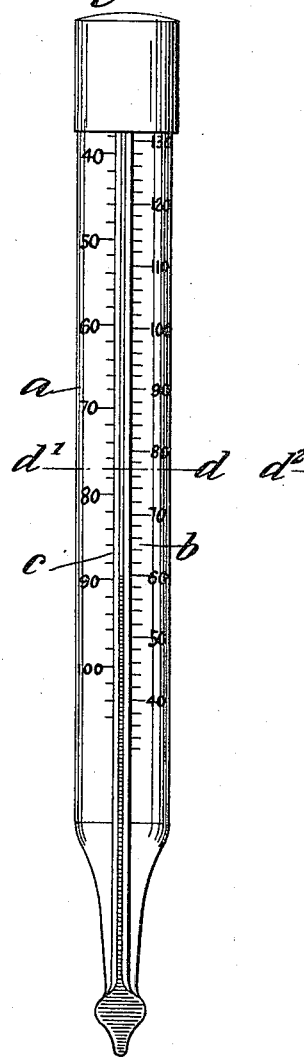
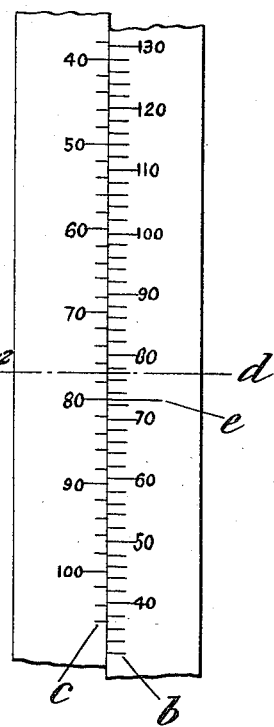
Witnesses:
M. E. McDade
Inventor
Alfred Watkins
by
Attorney

UNITED STATES PATENT OFFICE.

ALFRED WATKINS, OF HEREFORD, ENGLAND.

THERMOMETER FOR BAKERS.

1,153,740.  Specification of Letters Patent.  Patented Sept. 14, 1915.

Application filed December 8, 1914. Serial No. 876,133.

*To all whom it may concern:*

Be it known that I, ALFRED WATKINS, a subject of the King of Great Britain, residing in Hereford, England, have invented a certain new and useful Improved Thermometer for Bakers, of which the following is a specification.

This invention has for its object an apparatus for use by bakers for readily determining the relative temperatures that dough ingredients, flour and liquid, which on being mixed are to form the dough, must have before mixture in order that they may yield a dough that will acquire a desired temperature.

In baking operations dough of different temperatures, that is dough of high and low temperatures, is employed. The quality of dough depends upon the degree to which it is fermented. A low temperature dough left for a long period will be substantially of the same quality as a high temperature but otherwise similar dough left to ferment for a comparatively short period.

Experimental data show that if dough is to have a temperature of 80° F., after fermentation and the flour from which it is to be made has before mixing a temperature of 77°, then the temperature of the liquid to be mixed with the flour must also be substantially 77°, that is the ingredients in this case are about 3° below the temperature that the dough will attain after fermentation. If, however, the temperature of the flour be above or below 77° and 80° dough is still desired, then the temperature of the liquid to be mixed with the flour must necessarily be lower or higher, as the case may be, though not to an extent corresponding to the difference between 77° and the flour temperature.

With a view to determining quickly and easily these differences or in other words the temperatures that the liquid must have in order that, when mixed with flour of a certain temperature, a dough of 80° will result, I have devised the apparatus the object of this invention. The apparatus may, however, be constructed so that it may be used for doughs that are to have temperatures other than 80°.

The apparatus consists of the scales which are fixed or relatively movable with respect to one another according as it is to be used with dough of a fixed temperature or a varying temperature. The scales are placed longitudinally, one of the other, with their scale division lines parallel and oppositely disposed. One of the scales, which I will term the "flour temperature" scale is an ordinary temperature scale with suitable divisions. The other scale is of an empirical nature, and will be termed the scale of code numbers or liquor scale, and is used for indicating the temperature that liquor must have so that, when mixed with a flour of some known temperature, there will result a dough of a desired temperature.

The invention will be described with reference to the accompanying drawings in which—

Figure 1 is an elevation of one form of the apparatus according to this invention, in which the scales are fixed, and which is intended for use in baking operations where the dough is to be always of a constant temperature and in the example shown of 80° F.; Fig. 2 is a view of two relatively movable scales used in a modified form of the apparatus.

The thermometer apparatus shown in Fig. 1 consists of a suitably formed thermometer $a$ having a thermometer scale $b$ adjacent to one side of the mercury or like tube serving as the flour temperature scale. On the other side of the mercury tube is a second scale $c$ having divisions that are determined by experiment. The scale $c$ may be termed the code number scale or liquor scale.

Generally speaking, the relation between the two scales is such that 30 divisions on the flour scale are approximately equal to 22 divisions on the liquor scale.

The device or apparatus shown in Fig. 1 is one that is adapted for use when the dough to be formed is to have a constant temperature, which in the example illustrated is supposed to be 80°. The two scales of this apparatus are fixed and in such relation to one another that if a line $d$ be drawn across the flour scale in correspondence with what would be the 77° division, then the line will be found to be, as explained above, in register with a line $d'$ on the liquor scale corresponding with what would be the 77° division on that scale.

In using the form of apparatus shown in Fig. 1 the temperature of the flour is ascertained by placing the thermometer in the flour and reading the temperature on the flour scale. The figure thus read is taken as a code number, and the right temperature to which the liquor must be mixed is indicated by the number corresponding to the division on the flour scale which is opposite the division on the left hand or liquor scale, which bears a number the same as the ascertained code number.

A thermometer apparatus having scales, formed as shown in Fig. 2, is used in operations for producing doughs having various temperatures. The flour scale in Fig. 2 is provided with a fixed index e which has a position between the divisions thereon corresponding with 72° and 74°. In using apparatus with relatively movable scales and of the form shown in Fig. 2 the scales are first of all set so that the index e registers with the division on the liquor scale that bears a figure corresponding with the temperature that the dough is to have. The temperature of the flour is then ascertained by placing the apparatus in the flour and reading off the figure indicating the temperature on the flour scale, which figure is to be taken as the code number. The requisite temperature of the liquor can be then readily ascertained for it is indicated by the division on the flour scale which is opposite the division on the liquor scale which bears a number or figure the same as the ascertained code number of the flour.

The temperature number opposite the division on the liquor scale bearing a number corresponding with the ascertained code number is that of the temperature to which the liquor must be mixed. For example, if the scales are set as in Fig. 2 and the ascertained flour temperature is 70° the temperature to which the liquor must be mixed is indicated opposite the code number 70 on the liquor scale, namely 87°.

Having thus described the nature of the said invention and the best means I know of carrying the same into practical effect, I claim:—

1. Apparatus for determining the relative temperature of the flour and liquor ingredients of dough, before the same are mixed, so that dough having a desired temperature may result, which comprises a thermometer having an ordinary temperature scale, for indicating the temperature of the flour, and an empirically divided scale, the said scale being parallel and arranged with respect to one another in such a manner that the requisite temperature of the liquor will be indicated by that division on the flour temperature scale which is opposite the division on the empirical scale which bears a number or figure the same as that of the division on the flour temperature scale indicating the ascertained temperature of the flour.

2. Apparatus for determining the relative temperatures of the flour and liquor ingradients of dough, before the same are mixed, so that dough having a desired temperature may result, which comprises a thermometer having an ordinary temperature scale, for indicating the temperature of the flour, said scale having a fixed index and a second scale empirically divided, said second scale being adjustably movable relatively to the flour scale so that the division on the second scale bearing the number corresponding with the temperature that dough is to have may be brought into register with the said index whereupon the requisite temperature of the liquor will be indicated by that division on the flour temperature scale which is opposite the division on the empirically divided scale which bears a number or figure the same as that of the division on the flour temperature scale indicating the ascertained temperature of the flour.

In testimony whereof I have signed my name to this specification in the presence of two subscribing witnesses.

ALFRED WATKINS.

Witnesses:
 JAS. C. NICHOLS,
 CHAS. S. SOUTHGATE.

Copies of this patent may be obtained for five cents each, by addressing the "Commissioner of Patents, Washington, D. C."